(12) United States Patent
Gagne-Keats et al.

(10) Patent No.: US 12,259,965 B2
(45) Date of Patent: *Mar. 25, 2025

(54) MOBILE DEVICE WITH SECURE PRIVATE MEMORY

(71) Applicant: Osom Products, Inc., Cupertino, CA (US)

(72) Inventors: Jason Sean Gagne-Keats, Cupertino, CA (US); Wolfgang Wesley Muller, San Francisco, CA (US); Gary Anderson, San Francisco, CA (US); Nicholas Franco, San Jose, CA (US); Jean-Baptiste Charles Theou, Sene (FR)

(73) Assignee: SOLANA MOBILE INC.

( * ) Notice: Subject to any disclaimer, the term of this patent is extended or adjusted under 35 U.S.C. 154(b) by 21 days.

This patent is subject to a terminal disclaimer.

(21) Appl. No.: 18/188,802

(22) Filed: Mar. 23, 2023

(65) Prior Publication Data

US 2023/0229760 A1     Jul. 20, 2023

Related U.S. Application Data

(62) Division of application No. 17/466,429, filed on Sep. 3, 2021, now Pat. No. 11,625,480.

(Continued)

(51) Int. Cl.
*G06F 21/54* (2013.01)
*G06F 9/4401* (2018.01)
(Continued)

(52) U.S. Cl.
CPC .............. *G06F 21/54* (2013.01); *G06F 9/441* (2013.01); *G06F 21/32* (2013.01); *G06F 21/51* (2013.01);
(Continued)

(58) Field of Classification Search
CPC .......... G06F 21/32; G06F 21/51; G06F 21/74; G06F 9/441; G06F 2221/2105; G06F 2221/2141; H04W 12/37

See application file for complete search history.

(56) References Cited

U.S. PATENT DOCUMENTS 5,446,864 A * 8/1995 Burghardt ........... G06F 12/1433
                                                                    711/E12.1
6,609,199 B1    8/2003 Detreville
(Continued)

FOREIGN PATENT DOCUMENTS

WO     2017208064 A1    12/2017

OTHER PUBLICATIONS

NPL Search Terms (Year: 2024).*

(Continued)

*Primary Examiner* — Syed A Zaidi
(74) *Attorney, Agent, or Firm* — Perkins Coie LLP; Andrew T. Pettit

(57) ABSTRACT

A mobile device can detect an idle state and, in response, initiate an access monitoring function to covertly monitor activity involving a human interaction with the mobile device. The covert monitoring is undetectable by a user of the mobile device. The mobile device can then detect a human interaction with the mobile device and, in response, cause the mobile device to covertly capture and log one or more human interactions with the mobile device. An authorized user of the mobile device is enabled to review the log of human interactions with the mobile device.

15 Claims, 8 Drawing Sheets

Related U.S. Application Data

(60) Provisional application No. 63/075,688, filed on Sep. 8, 2020.

(51) Int. Cl.

| | | |
|---|---|---|
| *G06F 21/32* | (2013.01) | |
| *G06F 21/51* | (2013.01) | |
| *G06F 21/53* | (2013.01) | |
| *G06F 21/57* | (2013.01) | |
| *G06F 21/60* | (2013.01) | |
| *G06F 21/74* | (2013.01) | |
| *G06F 21/79* | (2013.01) | |
| *H04W 12/37* | (2021.01) | |

(52) U.S. Cl.
CPC ............ *G06F 21/53* (2013.01); *G06F 21/572* (2013.01); *G06F 21/602* (2013.01); *G06F 21/74* (2013.01); *G06F 21/79* (2013.01); *H04W 12/37* (2021.01); *G06F 2221/2105* (2013.01); *G06F 2221/2141* (2013.01)

(56) References Cited

U.S. PATENT DOCUMENTS

| | | | |
|---|---|---|---|
| 7,380,275 B2 | 5/2008 | Srinivasan et al. | |
| 8,254,568 B2 | 8/2012 | Smith et al. | |
| 8,984,592 B1 | 3/2015 | Paczkowski et al. | |
| 2002/0129245 A1 | 9/2002 | Cassagnol et al. | |
| 2004/0123118 A1 | 6/2004 | Dahan et al. | |
| 2004/0203682 A1 | 10/2004 | Hinds et al. | |
| 2004/0268135 A1 | 12/2004 | Zimmer et al. | |
| 2005/0289351 A1 | 12/2005 | England et al. | |
| 2006/0036851 A1 | 2/2006 | Detreville | |
| 2006/0090084 A1* | 4/2006 | Buer .................. | G06F 21/53 713/189 |
| 2007/0061594 A1* | 3/2007 | Ginter .................. | G06Q 10/10 713/165 |
| 2007/0150681 A1 | 6/2007 | Frank et al. | |
| 2008/0165952 A1 | 7/2008 | Smith et al. | |
| 2009/0292901 A1 | 11/2009 | Henry et al. | |
| 2011/0154032 A1 | 6/2011 | Mauro, II | |
| 2011/0306326 A1 | 12/2011 | Reed et al. | |
| 2012/0221668 A1* | 8/2012 | Chen .................. | G06F 16/176 709/212 |
| 2012/0246641 A1* | 9/2012 | Gehrmann .......... | G06F 9/45533 718/1 |
| 2012/0304280 A1 | 11/2012 | Hayashida | |
| 2013/0139139 A1 | 5/2013 | Mallur et al. | |
| 2013/0279689 A1 | 10/2013 | Obaidi | |
| 2014/0115660 A1 | 4/2014 | Chinta | |
| 2014/0137183 A1 | 5/2014 | Russello et al. | |
| 2014/0283141 A1 | 9/2014 | Shephard et al. | |
| 2014/0298026 A1 | 10/2014 | Isozaki et al. | |
| 2015/0052616 A1 | 2/2015 | Hutchison et al. | |
| 2015/0143514 A1 | 5/2015 | Paksoy et al. | |
| 2017/0103233 A1 | 4/2017 | Sibert | |
| 2017/0319861 A1 | 11/2017 | Golden | |
| 2018/0068106 A1 | 3/2018 | Archibald et al. | |
| 2018/0232534 A1 | 8/2018 | Dotan-Cohen et al. | |
| 2019/0272394 A1* | 9/2019 | Desai .................. | G06F 21/72 |
| 2019/0312987 A1 | 10/2019 | Ketsuka et al. | |
| 2020/0110869 A1* | 4/2020 | Domke .................. | H04L 9/50 |
| 2020/0117777 A1* | 4/2020 | Brown .................. | G06F 21/74 |
| 2020/0151336 A1* | 5/2020 | Maletsky .............. | G06F 21/575 |
| 2021/0081537 A1* | 3/2021 | Strong .................. | G06F 9/441 |

OTHER PUBLICATIONS

Yan, Zheng, et al., "A Security and Trust Framework for Virtualized Networks and Software-defined Networking", Security and communication networks 9.16 (2016): 3059-3069 (Year: 2016), 2016, 13 pp.

\* cited by examiner

MOBILE DEVICE WITH SECURE PRIVATE MEMORY

CROSS-REFERENCE TO RELATED APPLICATION

This application is a divisional of U.S. Non-Provisional patent application Ser. No. 17/466,429, titled "MOBILE DEVICE WITH SECURE PRIVATE MEMORY" and filed on Sep. 3, 2021, which claims benefit of U.S. Provisional Patent Application No. 63/075,688, titled "SECURE MOBILE DEVICE WITH PRIVATE MEMORY" and filed Sep. 8, 2020; the contents of the previously identified applications are incorporated herein by reference in their entireties.

TECHNICAL FIELD

The disclosed teachings relate to techniques for securing a mobile device with hardware or software security features that protect the user's privacy.

BACKGROUND

As the number of mobile devices continues increasing, mobile security becomes more important. Mobile security is the protection of portable devices such as smartphones, smartwatches, and tablets from threats and vulnerabilities. People are now commonly using mobile devices for tasks that involve handling private data like credit card numbers, social security numbers, banking information, and healthcare information. This creates a larger target for hackers and a larger collection of private data that can be stolen.

A mobile device user is exposed to various threats when they use their device. These threats can disrupt the operation of the mobile device and transmit or modify user data. Accordingly, applications must guarantee privacy and integrity of the information they handle. In addition, since some applications ("apps") could themselves be malware, their functionality and activities should be limited (e.g., restricting the apps from accessing location information via global positioning system (GPS), blocking access to the user's address book, preventing the transmission of data on the network, sending SMS messages that are billed to the user).

Mobile devices have many vulnerabilities. For example, smartphones are data management devices that store sensitive data like credit card numbers, authentication information, private information, and activity logs (calendar, call logs), which are prime targets for hackers. In another example, a mobile device can transmit information related to the owner of the mobile device, and a hacker may want to steal the identity of the owner of the mobile device to commit other offenses. In yet another example, a hacker can impair an owner's ability to access a mobile device thereby depriving the owner of its use.

There are numerous other threats to mobile devices, including annoyance, stealing money, invading privacy, propagation, and malicious tools. With botnets, attackers infect multiple machines with malware that victims generally acquire via e-mail attachments or from compromised applications or websites. The malware then gives hackers remote control of "zombie" devices, which can then be instructed to perform harmful or covert acts. With malicious applications, hackers upload malicious programs or games to third-party smartphone application marketplaces. The programs steal personal information and open backdoor communication channels to install additional applications and cause other problems. Further, malicious links on social networks are an effective way to spread malware where hackers can place Trojans, spyware, and backdoors. Hackers use spyware to hijack phones, allowing them to hear calls, see text messages and e-mails as well as track someone's location through GPS updates.

BRIEF DESCRIPTION OF THE DRAWINGS

Embodiments of the present technology will be described and explained through the use of the accompanying drawings.

Figure 1:
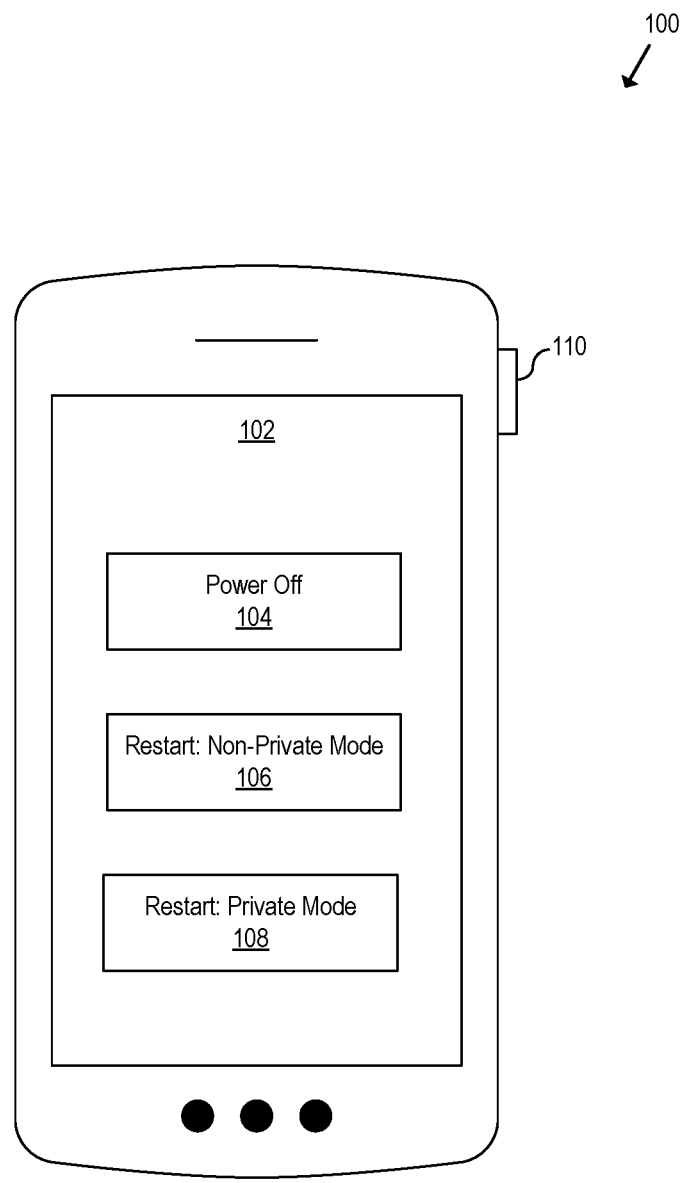
FIG. 1 illustrates a mobile device that can be switched between a private mode and non-private mode.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technology includes a hardware architecture and associated software and/or firmware for securing private data on a mobile device (e.g., smartphone). In particular, the technology includes hardware and software features that provide robust privacy and security. The technology improves over existing mobile devices that include privacy and security features that are unreliable, inconsistent, or untrustworthy. For example, a navigation application running on a wireless device can track the whereabouts of the wireless device. The navigation application can include an option to disable or deactivate its tracking function; however, disabling the tracking function does not ensure that the application is not tracking the user or that malware is not covertly tracking the user's activity. Moreover, applications that handle private information are susceptible to hacking and there is no certainty that any of the numerous applications available on an app store are safe and trustworthy. Accordingly, mobile devices lack a robust security and privacy architecture.

An embodiment includes a mobile device with a non-private memory that is configured to store multiple software programs. The multiple software programs can include an application and a driver program. The driver program controls operation of a cellular radio, Wi-Fi radio, global positioning system (GPS) module, Bluetooth radio, camera device, microphone device, or a USB port. The mobile device includes a private memory configured to store a copy of the multiple software programs and additionally store one or more trusted software programs ("trusted programs"). The trusted programs are exclusively stored in the private memory of the mobile device. In one example, the mobile device includes a processor configured to execute the multiple software programs stored at the non-private memory only when the mobile device is in a non-private mode, execute the one or more trusted programs only when the mobile device is in a private mode, and enable switching between the non-private mode and the private mode during reboot of the mobile device.

In some embodiments, the processor can switch the mobile device to operate in the private mode upon completing multifactor authentication (MFA). The MFA can verify factors including a passcode, biometric authentication, and/or near field communication (NFC) authentication relative to a concealed NFC chip. In some embodiments, the processor can switch the mobile device to operate in the private mode upon completing an NFC authentication procedure.

The processor, while operating in the non-private mode, can receive an indication of a user selection of a software program and remove the selected software program from the non-private memory. The processor can execute a restart procedure in response to user input. The restart procedure can include options to restart the mobile device in the non-private mode and to restart the mobile device in the private mode. The restart procedure for the non-private mode can include options to restart without the selected software program and to restart and restore the selected software program in the non-private memory. The processor can restart the mobile device by restoring the selected software program in the non-private memory from a copy of the software program in the private memory. In some embodiments, the selected software program is a driver program.

The embodiments include a method performed by a mobile device, which can detect that the mobile device is in an idle state. In response to detecting the idle state, the mobile device can initiate an access monitoring function of the mobile device to monitor activity indicative of a user interaction with the mobile device. The method includes detecting, with the access monitoring function, a user interaction with the mobile device. In response to detecting the user interaction, the mobile device is caused to covertly capture and record one or more human interactions with the mobile device. An authorized user of the mobile device can then review the recorded interactions to learn of any data breach or malicious activity.

Non-Private and Private Memories

The disclosed technology addresses security and privacy flaws in existing technology with a mobile device (e.g., smartphone) that includes or can access a private memory that is inaccessible during normal operations and a non-private memory configured to store data that is accessible for normal operations. In one example, the non-private memory and the private memory are different partitions of the same memory device. The private memory of the memory device can store sensitive data and related applications (e.g., financial data, secure messaging, medical data) separate from the non-private memory. In another example, the non-private and private memories are separate and distinct memory devices.

The mobile device can store software including an operating system (OS), applications ("apps"), driver programs, and non-private data on the non-private memory for normal operations. The non-private memory is accessible when the mobile device is in a "non-private mode." The private memory stores copies of the software in the non-private memory as well as additional trusted software (e.g., apps) that have been vetted by a trusted party to ensure the highest degree of privacy security. The trusted software can be available from a curated app store that only includes apps that have been validated by trusted security experts. This curated app store prevents undesirable installations from unscrupulous sources. Examples of the trusted apps include messaging, banking, crypto wallets, express VPN, camera, photos, files and transfers related apps.

The private memory is accessible when the mobile device is in a "private mode." Thus, the private memory can store copies of the OS, applications, and driver programs of the non-private memory, and trusted programs that are not stored on the non-private memory. Neither the mobile device, the user of the mobile device, nor any other device can access the private memory when the mobile device is in the non-private mode. There is no communication between the non-private and private memories while in a non-private mode. The disclosed technology can include a customized installer and a manager function to prevent any non-approved application from being installed, which prevents installation of sideloaded apps.

FIG. 1 illustrates a mobile device 100 that can be switched between a private mode and a non-private mode. In one example, the mobile device 100 is set to non-private mode by default. The mobile device 100 can be switched between private and non-private modes by, for example, rebooting the mobile device 100 to a selected mode. Rebooting is the process by which the mobile device 100 is restarted, either intentionally or unintentionally. Reboots can be either cold (alternatively known as hard), in which the power to the mobile device 100 is physically turned off and back on again causing an initial boot of the machine, or warm (or soft) in which the mobile device 100 restarts without the need to interrupt the power. The term "restart" can refer to a reboot when the OS closes all programs and finalizes all pending input and output operations before initiating the reboot.

The mobile device 100 has a display screen that presents a user interface 102 ("UI 102") such as a graphical user interface (GUI) that includes controls for rebooting. The UI 102 is composed of one or more layers, including a human-machine interface (HMI) that interfaces with physical input hardware such as a touchscreen or hardware buttons and output hardware such as the same touchscreen or a speaker. A device that implements an HMI is called a human interface device (HID). Other terms for human-machine interfaces are man-machine interface (MMI) and, when the machine is a computer, human-computer interface. Additional UI layers may interact with one or more human senses, including: tactile UI (touch), visual UI (sight), auditory UI (sound), etc.

The UI 102 includes graphical controls such as a "power off" control 104, a "restart: non-private mode" control 106 and a "restart: private mode" control 108. A graphical control (or graphical widget) is a software component that a user interacts with through direct manipulation to control, read, or edit information about an application. Each control facilitates a specific user-device interaction and appears as a visible part of the GUI as rendered by a rendering engine. Examples of graphical controls include labels, buttons, and check boxes. In one example, the UI 102 presents the power-off control 104, the restart: non-private mode control 106 and the restart: private mode control 108 after, for example, a user holds a hardware button 110 on the mobile device 100 for a threshold amount of time (e.g., 3 seconds). By rebooting the mobile device 100, a user can selectively add/remove applications to/from the non-private memory, as described later.

After the user actuates the power off control 104, restarting the mobile device 100 can present similar options for the user to select between starting the phone in a non-private mode or a private mode. When the user actuates the restart: non-private mode control 106, the mobile device 100 reboots in the non-private mode and authenticates a user that enters a correct passcode, undergoes biometric authentication (e.g., fingerprint or face recognition), or completes any other process of identifying a user that requests access to the mobile device 100. When the user selects the restart: private mode control 108, the mobile device 100 can require the user to perform an extra authentication step to ensure that the user is authenticated and authorized to reboot the mobile device 100 in the private mode. For example, the mobile device can require MFA to restart in private mode.

MFA is a security mechanism that requires an individual user to provide two or more factors (e.g., pieces of evidence) in order to authenticate the user's identity. A first factor is commonly a credential (e.g., user ID, password, passcode). Additional factors can include hardware tokens, numerical codes, biometrics, time, and location. Using any combination of these factors provides MFA, although most implementations leverage two factors, which is why MFA is also known as two-factor authentication (2FA). By leveraging multiple factors instead of one, the authentication process required to enter private mode will remain highly secure even if one of the authentication factors is compromised.

NFC Authentication to Access Private Memory

An aspect of the disclosed technology includes an authentication procedure that uses NFC to enable rebooting the mobile device in a private mode. NFC protocols enable communication between two electronic devices, or an electronic device and an NFC computer chip over a short distance (e.g., 4 cm or less). NFC offers a low-speed connection with a simple setup that can be used to bootstrap more-capable wireless connections. For example, NFC devices are used in contactless payment systems and allow mobile payments, replacing or supplementing systems such as credit cards. NFC can also be used to share small files such as contacts and bootstrapping fast connections to share larger media such as photos, videos, and other files. Here, the NFC technology provides an electronic identity or keycard that enables a user to reboot the mobile device in private mode. In particular, an NFC chip that is held by an authorized user can enable reboot of the mobile device in private mode. The NFC chip can be concealed in a wearable device or another object that belongs to the authorized user such as a wallet.

Figure 2:
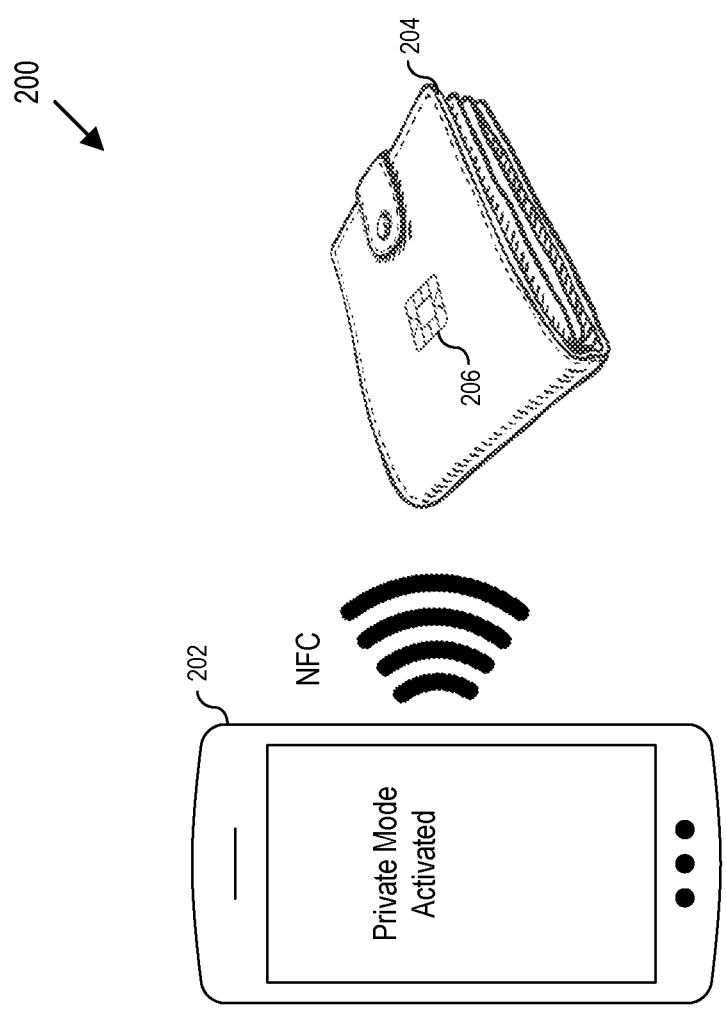
FIG. 2 illustrates a system for near field communication (NFC) authentication between a mobile phone and a wallet that embeds an NFC chip.

FIG. 2 illustrates a system 200 for NFC authentication between a mobile device 202 and a wallet 204 that embeds an NFC chip 206. The mobile device 202 is authorized to instantiate a private mode when authorized by bringing the wallet 204 near the mobile device (e.g., within a threshold distance). The system 200 illustrates the wallet 204 for ease of understanding, though the NFC chip 206 can be embedded in any virtual or tangible object. For example, the NFC chip 206 can be embedded in a wristwatch, glasses, backpack, etc. In one example, the NFC chip 206 can be embedded in a sticker that the user can freely place on any object that the user chooses. For example, the NFC sticker can be placed in an authorized user's headphones. As such, the user can conceal the NFC chip 206 to provide an authentication factor that would grant the user permission to restart the mobile device 202 in private mode when the NFC chip 206 is sufficiently near the mobile device 202. Accordingly, the user can switch the mobile device 202 from any mode to a private mode by selecting private mode for rebooting and bring the NFC chip 206 near the mobile device 202. The NFC chip 206 can act as a factor of an MFA procedure or be the sole authentication factor to switch the mobile device 202 to private mode.

While operating in non-private mode, the mobile device can receive an indication of a user selection of a software program and remove the selected software program from the non-private memory. The mobile device can then execute a restart procedure in response to user input. The restart procedure can include options to restart the mobile device in the non-private mode or to restart the mobile device in the private mode. The procedure for restarting the mobile device in the non-private mode includes options to restart the mobile device without the selected software program and to restart the mobile device and restore the selected software program in the non-private memory. Thus, the mobile device can receive an indication to restart the mobile device and restore the selected software program in the non-private memory and restart the mobile device by restoring the selected software program in the non-private memory from a copy of the software program in the private memory.

In one example, the mobile device includes a communication channel configured to transfer data between the private memory and the non-private memory. The communication channel can be disabled when the mobile device is in the non-private mode and enabled when the mobile device is in the private mode. In one example, the mobile device can transfer any of the multiple software programs from the private memory to the non-private memory only when the mobile device is in the private mode. Further, a software program transferred from the private memory can replace an existing software program stored on the non-private memory.

The mobile device can include one or more power sources (e.g., batteries) that power the private memory and the non-private memory. In one example, the private memory and the non-private memory both draw power from the power sources when the mobile device is in a private mode. In contrast, only the non-private memory draws power from the power sources when the mobile device is in a non-private mode.

In another example, the non-private memory can store the software programs in accordance with a first encryption protocol and the private memory can store the copies of the software programs and/or trusted programs in accordance with a second encryption protocol different from the first encryption protocol. The second encryption protocol can require an additional authentication factor. In one implementation, the copies of the software programs or the trusted software program stored in the private memory are encrypted when the mobile device is in a non-private mode. The copies of the software programs and/or trusted programs stored in the private memory can be decrypted when the mobile device is in a private mode.

Figure 3:
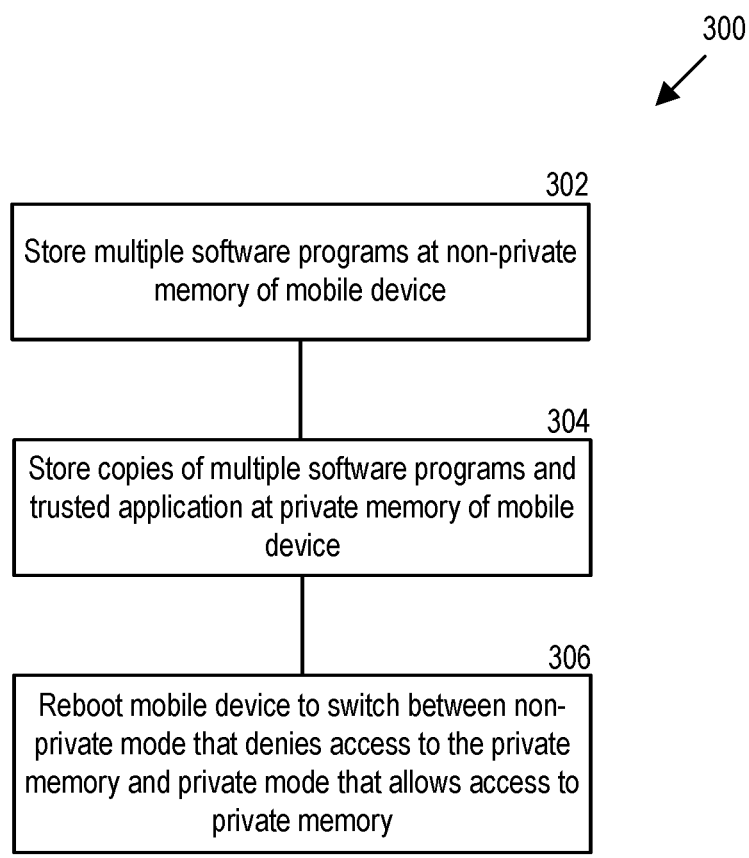
FIG. 3 is a flowchart that illustrates a process for managing access to a private memory and a non-private memory associated with a mobile device.

FIG. 3 is a flowchart that illustrates a process 300 for managing access to a private memory and a non-private memory associated with a mobile device. In one example, the mobile device includes a non-private memory that can store software programs (e.g., an application and a driver program) and a private memory that can store copies of the software programs and additionally store trusted programs. In one example, the non-private memory and the private memory are different partitions of a common memory device. In another example, the non-private memory and the private memory are part of separate and distinct memory devices. In one example, the driver program controls operation of a radio access technology (RAT) device, a positioning, navigation, or timing (PNT) device, an input/output (I/O) device, or a communications port of the mobile device. Examples of the RAT device includes a cellular radio, a Wi-Fi radio, or a Bluetooth radio. Examples of the PNT device includes a global positioning system (GPS) receiver. Examples of the I/O device includes a camera, microphone, or speaker. Examples of the communications port is a universal serial bus (USB) port or a firewire port.

At 302, software programs are stored at a non-private memory associated with the mobile device. The software programs can include application software and driver software. As indicated earlier, the driver program controls operation of a RAT device, a PNT device, an I/O device, or a communications port of the mobile device. In one example, the software programs stored on the non-private memory are executable when the mobile device is in a non-private mode and/or private mode.

At 304, copies of the software programs and one or more trusted software programs are stored at a private memory of the mobile device. The trusted software programs are only stored in the private memory of the mobile device. The mobile device can execute a trusted software program stored on the private memory only when the mobile device is in a private mode. The mobile device can transfer or copy data from the private memory to the non-private memory when the mobile device is in the private mode. However, the reverse procedure of transferring or copying data from the non-private memory to the private memory may be unavailable or blocked. The mobile device can be booted in a non-private mode that forbids access to copies of software programs stored on the private memory or booted in a private mode that allows access to the software programs stored on the private memory. In one example, the mobile device can only execute trusted software programs stored on the private memory only when the mobile device is in the private mode.

At 306, the mobile device can switch between a non-private mode and a private mode upon reboot. The non-private mode forbids access to the private memory and the private mode allows access to the private memory. In one example, the mobile device can switch from private mode to non-private mode in response to completion of a first authentication procedure. The mobile device can switch from non-private mode to private mode in response to completion of a second authentication procedure different from the first authentication procedure. For example, the second authentication procedure can include an additional authentication factor.

The disclosed technology can be implemented in a system with distributed components. For example, in general, the system can include a first memory configured to store software and a second memory configured to store a copy of the software and an application that is not stored in the first memory. A processor can switch a computing device between a first mode and a second mode. In the first mode, the computing system is allowed access to the first memory and denies access to the second memory. In a second mode, the computing device is allowed access to the second memory. In one example, the first memory is at a cloud storage system and the second memory is at the computing device. Alternatively, the second memory can be at the cloud storage system and the first memory at the computing device. The system can execute the application only when the computing device is in the second mode. Moreover, the system enables the computing device to selectively switch between the first mode and the second mode in response to a selective reboot procedure.

Selectively and Temporarily Modifying a Non-Private Memory

An aspect of the disclosed technology provides security and privacy with a flexible mechanism that allows users to remove software programs selectively and temporarily from non-private memory and restore the removed software programs from copies stored in private memory. As such, during normal operations, a bad actor cannot use the software programs to conduct malicious activity on a mobile device because the software programs are not physically available on the non-private memory to a hacker.

For example, the non-private memory can store an app that includes a tracking feature that tracks the location or activity of a user. Disabling the tracking feature of the app does not guarantee that the app cannot covertly track the user. Further, disabling an associated PNT feature (e.g., GPS function) of the mobile device does not guarantee that the mobile device (e.g., including malicious code) cannot allow the app to covertly track the user. Likewise, disabling the cellular radio, WiFi, Bluetooth, camera, microphone, USB port, or other components of the mobile device does not ensure that malware cannot covertly operate the components or associated software.

To address the risk posed by software (e.g., apps, drivers) stored on the non-private memory, the disclosed technology allows users to selectively remove (e.g., uninstall, delete) software from the non-private memory thereby ensuring that the software and/or associated software cannot operate covertly. The mobile device can later restore the deleted software by copying the software to the non-private memory from the private memory. In particular, users can uninstall applications or remove driver programs on the non-private memory to prevent modules such as cellular radios, WiFi, GPS, Bluetooth, camera, microphone, or USB ports from operating covertly.

In one example, a user of the mobile device can access a menu while in a non-private mode to enter commands that remove software from the non-private memory. For example, the user can actuate a graphical button on a touchscreen of the mobile device or press a hardware button for a threshold period to cause the display to present a reboot or locked menu of icons including a list of applications, driver programs, and other software programs that the user can delete/uninstall. Marking or clicking an icon associated with the selected software program can cause the mobile device to delete the software from the non-private memory. The deleted software can be restored to the non-private memory later from the private memory, which can only be accessed during a reboot process and/or while in private mode, for example.

Figure 4:
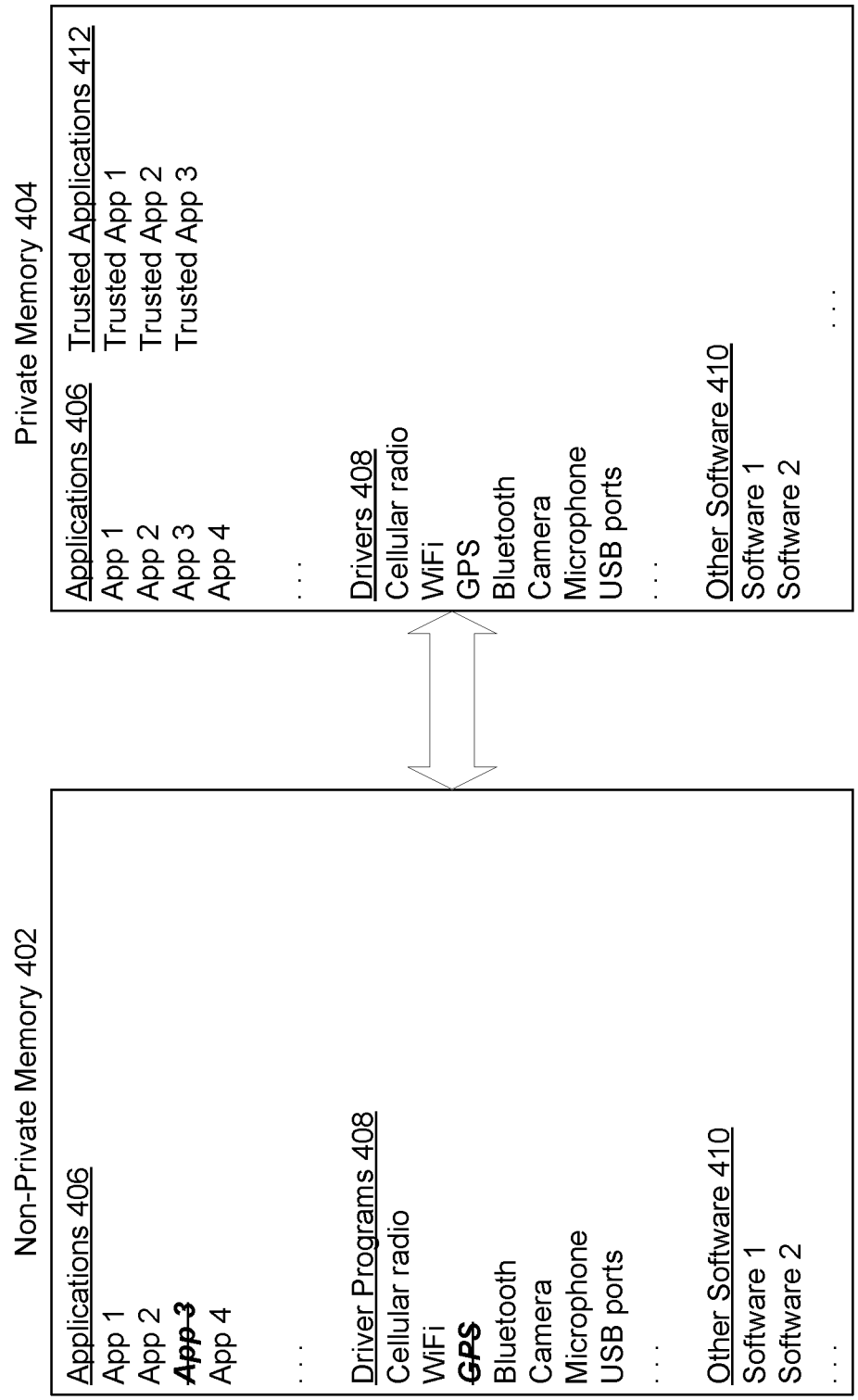
FIG. 4 is a block diagram that illustrates modified content of non-private memory, which can be restored from content of private memory in a mobile device.

FIG. 4 is a block diagram 400 that illustrates modified content of the non-private memory 402 that can be restored from content of private memory 404. As shown, the non-private memory 402 stores applications 406 including App 1, App 2, and App 4. App 3 has been removed from the non-private memory 402. The non-private memory 402 also stores driver programs 408 for the cellular radio, WiFi, Bluetooth, camera, microphone, or USB ports. The driver program for the GPS has been removed. The non-private memory 402 includes other software 410: software 1 and software 2. The private memory 404 includes counterpart copies of all the applications 406, driver programs 408, and other software 410, which can be used to restore any of the software programs (e.g., App 3, GPS) removed from the non-private memory 402. The private memory 404 additionally stores trusted programs (e.g., Trusted App 1, Trusted App 2, Trusted App 3) that have been vetted by a trusted source.

Figure 5:
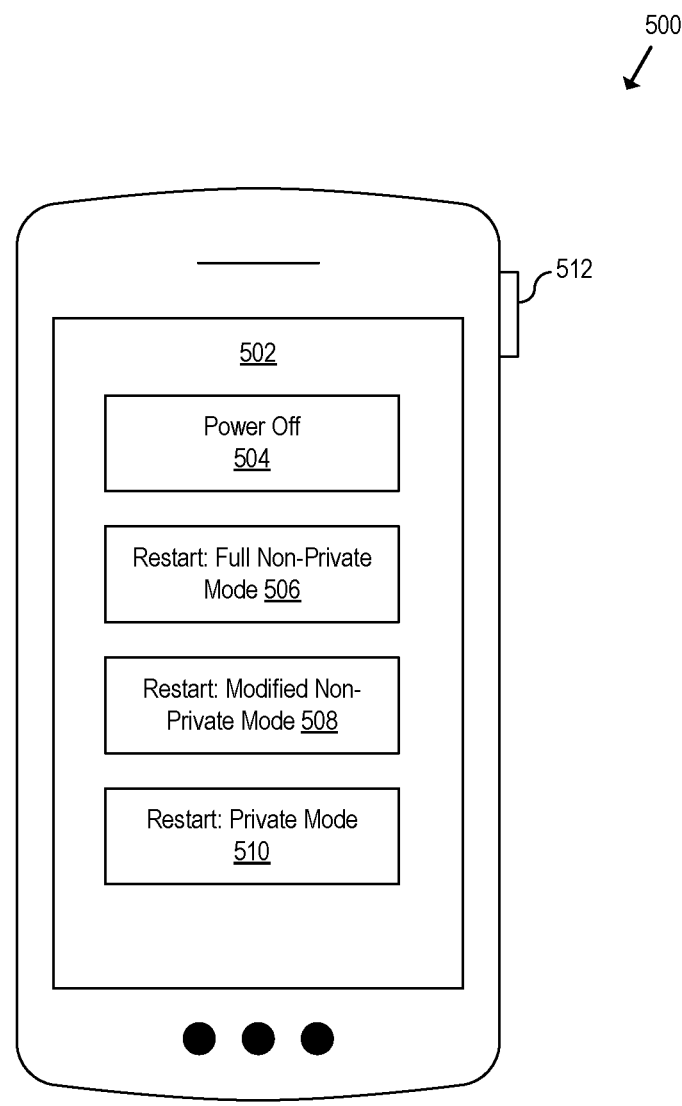
FIG. 5 depicts a mobile device with a user interface that includes controls to restart a mobile device in a full non-private mode or a modified non-private mode.

FIG. 5 depicts a mobile device 500 that presents a UI 502 including controls to restart the mobile device 500 in a "full non-private mode" or "modified non-private mode." In one example, the modified non-private mode starts the mobile device 500 from any mode to the non-private mode that was recently utilized (e.g., prior state of non-private mode), which had software removed. Alternatively, the modified non-private mode can allow the user to remove or restore selected software upon executing a boot procedure so that the non-private mode has software removed or restored. As such, the user can selectively re-add applications, drivers or other software when booting the mobile device 500, when the user is authenticated to do so (as described earlier). The full non-private mode restarts the mobile device by restoring all software programs that were previously removed from the non-private memory with copies stored in the private memory. Thus, the full non-private restores copies of any and all deleted software programs to the non-private memory from the private memory.

In one example, the mobile device 500 is set to a non-private mode by default. The mobile device 500 can be switched between private and full or modified non-private modes by, for example, rebooting the mobile device 500 to the selected mode. The mobile device 500 has a display screen that can present a UI 502 for booting. The UI 502 has graphical controls including a "power off" control 504, a "restart: full non-private mode" control 506, a "restart: modified non-private mode" control 508, and a "restart: private mode" control 510. In one example, the mobile device 500 presents the UI 502 after, for example, a user holds a hardware button 512 on the mobile device 500 for a threshold amount of time (e.g., 3 seconds). By rebooting the mobile device 500, a user can selectively remove/restore applications from/on the non-private memory.

When the user actuates the power off control 504, restarting the mobile device 500 can present similar options for the user to select between starting the mobile device 500 in non-private modes or a private mode. When a user actuates the restart: full non-private mode control 506, the mobile device 500 reboots in the full non-private mode and restores all the software programs on the non-private memory after successful user authentication. The fully restored version of the non-private memory can be a default setting. When the user actuates the restart: modified non-private mode control 508, the mobile device 500 reboots to the modified non-private mode and can restore only some of the software on the non-private memory after successful user authentication. When the user selects the restart: private mode control 510, the mobile device 500 can require the user to perform an extra authentication step to ensure that only an authorized user can reboot the mobile device 500 in the private mode.

Figure 6:
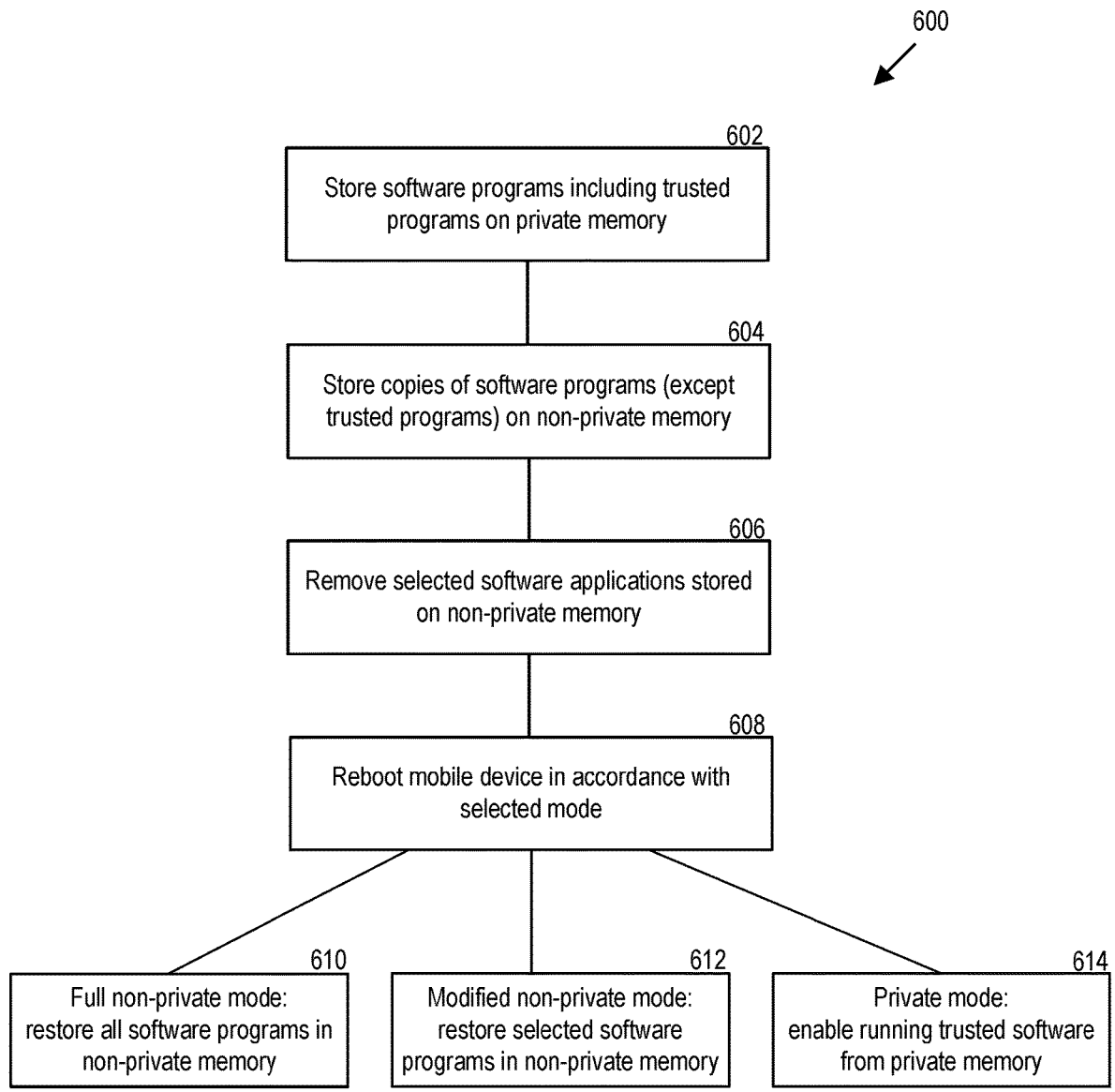
FIG. 6 is a flowchart that illustrates a process for selectively restoring software at a non-private memory from a private memory of a mobile device.

FIG. 6 is a flowchart that illustrates a process 600 for selectively restoring software programs at the non-private memory from the private memory.

At 602, software programs are stored on a private memory. Examples of the software programs include application software and driver software. The private memory also stores trusted programs. A trusted program that is stored at the private memory is only executable when the mobile device is in the private mode (e.g., without transferring or copying the trusted program to the non-private memory).

At 604, copies of the software programs are stored on the non-private memory. The trusted programs are not stored at the non-private memory. In one implementation, the non-private memory and the private memory are different partitions of a common memory device. In another implementation, the non-private memory and the private memory are part of separate and distinct memory devices of the mobile device. In yet another implementation, the non-private memory is remotely located from the mobile device. That is, only the private memory is located at the mobile device.

In one example, the non-private memory stores the software programs in accordance with a first encryption protocol and the private memory stores copies of the software programs and/or trusted software program in accordance with a second encryption protocol different from the first encryption protocol. In another example, the software programs stored on the private memory are encrypted in accordance with one encryption protocol when the mobile device is in a non-private mode. Then, the software programs stored on the private memory are unencrypted when the mobile device is in a private mode.

At 606, one or more software programs are selected for removal from the non-private memory. For example, in response to a reboot command, the mobile device can present a menu of software programs that are available for deletion from the non-private memory. The user can then designate which software programs to uninstall from the non-private memory. The designated software program is then removed from the non-private memory. In one example, the user selects to remove a driver for a PNT device of the mobile device. In another example, the user selects to remove an app that includes a function for tracking user activity such as a navigation app, a gaming app, an entertainment app, a business app, an educational app, a lifestyle app, a travel app, or a utility app.

At 608, the mobile device receives user input including a command to re/boot or lock the mobile device. For example, the mobile device can receive user input that initiates a reboot procedure for the mobile device. In response to the user input, the mobile device can display on its display device (e.g., touchscreen), a UI including alternatively selectable graphical controls for the full non-private mode, the modified non-private mode, and the private mode. The user can select one of the selectable graphical controls to set the mobile device in a corresponding mode.

The mobile device is then set in one or more non-private modes or a private mode. Examples of the non-private modes include a full non-private mode and a modified private mode. In one example, the private mode enables access to software programs on both the non-private memory and the private memory. In contrast, the non-private mode enables access to software programs on the non-private memory but denies access to software programs and trusted software program stored on the private memory.

Thus, the user can selectively switch the mobile device between the full non-private mode, the modified non-private mode, and the private mode upon a re/boot of the mobile device. In one example, the user can switch from the private mode to the non-private mode in response to completion of a first authentication procedure, and switch from the full non-private mode or modified non-private mode to the private mode in response to completion of a second authentication procedure that requires an additional authentication factor compared to the first authentication procedure. An example of the additional authentication factor includes a passcode, a biometric factor, or a near field communication (NFC) factor relative to a concealed NFC chip.

At 610, in response to the mobile device being set in a full non-private mode, all the software programs that were previously removed from the non-private memory are restored by copying the software programs from the private memory to the non-private memory. The mobile device is rebooted in the full non-private mode where the non-private memory is restored to include copies of all the multiple software programs on the private memory that were once stored on the non-private memory. In another example, the full non-private mode defines a default group of software programs. As such, rebooting the mobile device to the full non-private mode resets the non-private memory to restore the default group of software programs.

At 612, in response to the mobile device being set in the modified non-private mode, only some software programs that were removed from the non-private memory are restored by copying only those software programs from the private memory to the non-private memory. For example, a user can select a particular software program to restore. The mobile device is rebooted in the modified non-private mode where only the selected software program is restored on the non-private memory based on a copy of the selected software program on the private memory. Thus, a software program can be selectively and temporarily removed from the non-private memory and, upon reboot of the mobile device, restore by copying the selected software program from the private memory.

At 614, in response to the mobile device being set in the private mode, the mobile device is enabled to, among other things, execute trusted software program stored on the private memory. In particular, software programs are normally executable from the non-private memory, but the trusted software program is only executable from the private memory. Further, any trusted program cannot be transferred to the non-private memory.

Access Monitoring

An aspect of the disclosed technology includes an access monitoring function, which can monitor a mobile device whether in the possession of an authorized user or not. In one example, when an authorized user does not have the mobile device, the access monitoring function can constantly monitor any software installs and notify the authorized user of installed apps and provide insights such as whether the app is deemed unsecure. For example, the access monitoring function can cause the mobile device to email the authorized user about installed software.

When the user sets down the mobile device or the mobile device is otherwise not with the user, the mobile device enters an idle state to track access attempts, unlock attempts, plug-ins, etc. A log of activity can be recorded and emailed to a predetermined address, along with an image of the person accessing the mobile device, which was captured with the mobile device's camera. If a person was able to gain access to contents of the mobile device, the access monitoring function can continuously track the user's activity while on the mobile device. The access monitoring function is operational in both the non-private mode and the private mode.

Thus, the access monitoring function can monitor human interactions with the mobile device while the user has or does not have possession of the mobile device by detecting events indicative of an idle state and an active state. For example, the mobile device can infer that the user lost possession of the mobile device when the phone detects an absence of light detected by a camera for a predetermined period of time, and then respond to detection of a subsequent interaction with the mobile device by capturing an image of a person that interacted with the mobile device, and record subsequent interactions for a period of time. As such, the authorized user (e.g., true owner) can receive notifications that the mobile device is being used and/or review a log of interactions, to ensure that the mobile device was not hacked.

Figure 7:
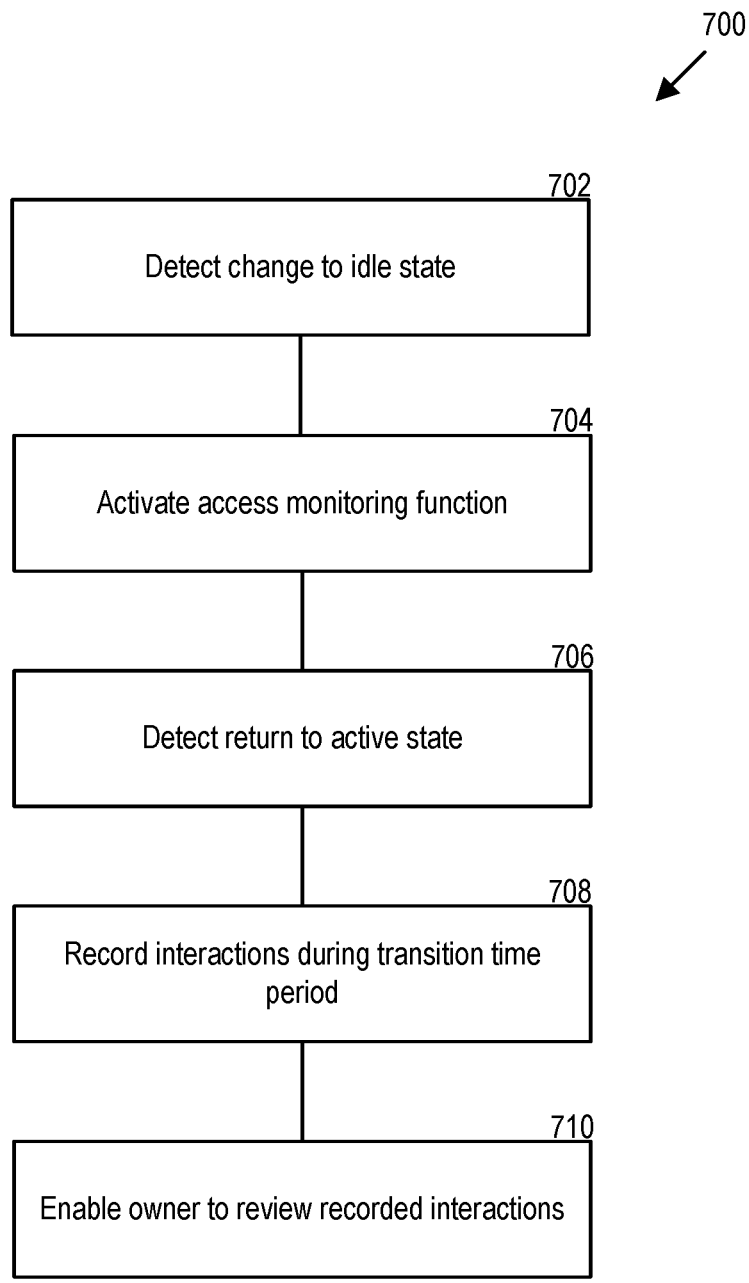
FIG. 7 is a flowchart that illustrates a method of an access monitoring function of a mobile device that detects malicious user-device interactions.

FIG. 7 is a flowchart that illustrates a method 700 of the access monitoring function. At 702, the access monitoring function detects a change in the mobile device to an idle state. For example, an accelerometer of the mobile device detects a transition from a period of activity that changes to a prolonged period of inactivity, indicating that the mobile device has been placed on a surface. The processor can also infer the absence of user activity based on inactivity of user apps (e.g., streaming video or music.)

At 704, the access monitoring function starts monitoring for activity of the mobile device (e.g., inputs, movement, utilization of applications or services). When the access monitoring function detects a pattern indicating that the mobile device is not being utilized, the mobile device enters an idle mode that captures subsequent activity as part of a log that can be reviewed by the owner later to determine whether an unauthorized person interacted with the mobile device.

At 706, the access monitoring function detects that the mobile device returned to an active state. For example, an accelerometer detects a transition from a prolonged period of inactivity that changes with sudden movement indicative of the mobile device being picked up by a person. In another example, the mobile device detects a verbal interaction with a virtual assistant of the mobile device.

At 708, the access monitoring function causes the mobile device to covertly record human-device interactions in a log during a time period. For example, the mobile device can capture one or more images with its camera when subsequent activity commences. The access monitoring function can monitor and record inputs, communications, or other inputs/outputs during the period that commenced when a first activity was detected and terminates at a later point in time. As such, the access monitoring function of the mobile phone can covertly record activity during transitions from idle to active states.

At 710, the authorized user (e.g., true owner) is enabled to review the recorded log of interactions. For example, the logged activity and captured images can be available to the owner via an app on the mobile device.

Computing Device

Figure 8:
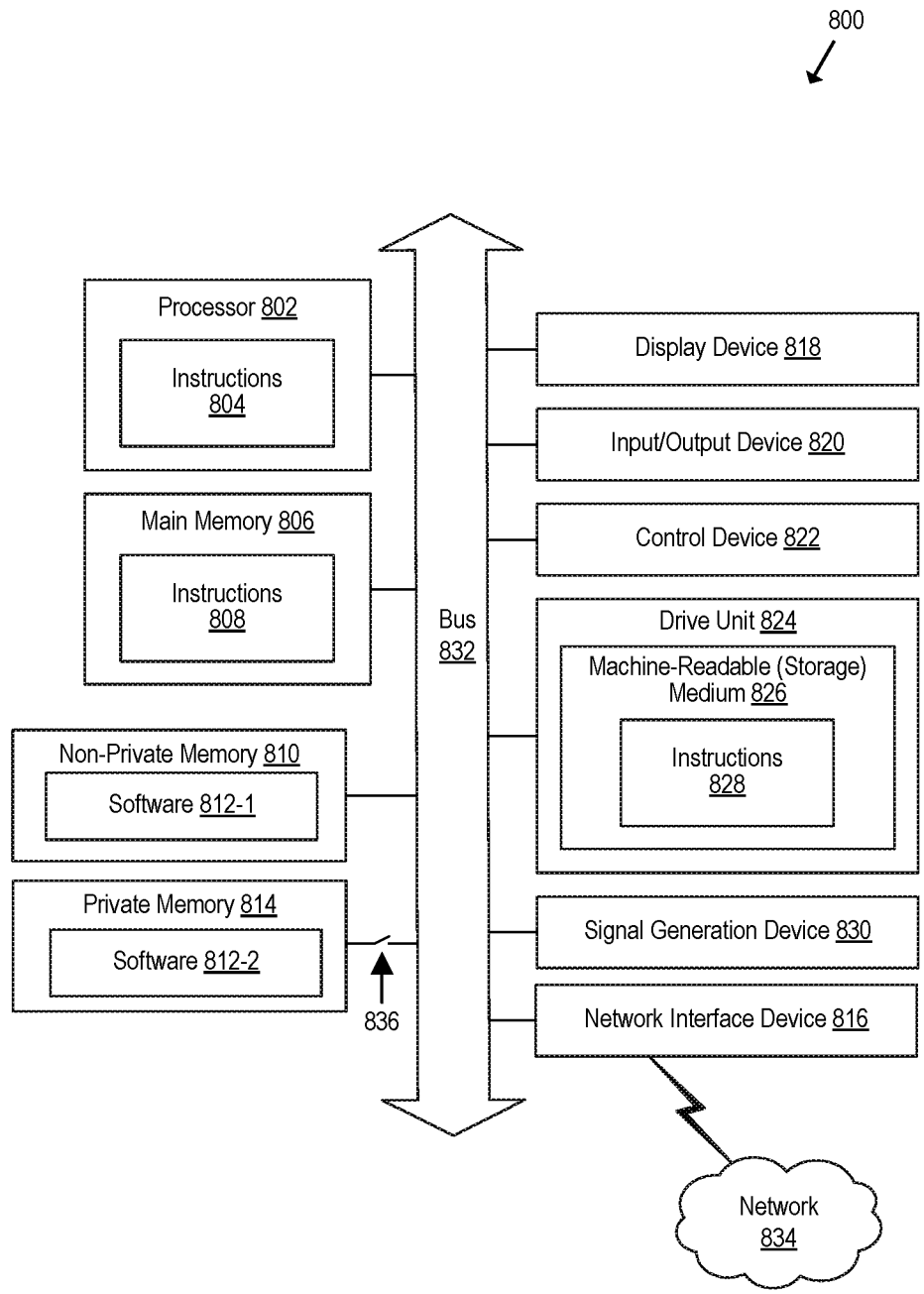
FIG. 8 is a block diagram that illustrates an example of a computing device in which at least some operations described herein can be implemented.

FIG. 8 is a block diagram that illustrates an example of a computing device 800 (e.g., mobile device) in which at least some operations described herein can be implemented. For example, components discussed in FIGS. 1-7 can include or host components of the computing device 800. The computing device 800 can include one or more processors 802, main memory 806, non-private memory 810 configured to store software 812-1, and private memory 814 configured to store software 812-2. The non-private memory 810 and the private memory 814 can be sectors of the same non-volatile memory device or belong to separate memory devices. The software 812-1 is copied in software 812-2, which includes additional trusted software. In addition, the private memory 814 can store private data and other data copied from the non-private memory 810.

The computing device 800 further includes a network interface device 816, video display device 818, an input/output device 820, a control device 822 (e.g., keyboard and point device), a drive unit 824 that includes a storage medium 826, and a signal generation device 830 that are communicatively connected to a bus 832. A communication channel 836 can connect/disconnect the private memory 814 from other components connected to the bus 832. The bus 832 or communication channel 836 can represent one or more physical connections and/or point-to-point connections that are connected by appropriate bridges, adapters, or controllers. In one example, the bus 832 can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 8 for brevity. Instead, the computing device 800 is intended to illustrate a hardware device on which components illustrated or described relative to the examples of FIGS. 1-7 and any other components described in this specification can be implemented.

The computing device 800 can take any suitable physical form. For example, the computing device 800 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing device 800. In some embodiment, the computer device 800 can be an embedded computer system, a system-on-chip (SOC), a single-board computer system (SBC) or a distributed system such as a mesh of computer systems or include one or more cloud components in one or more networks. Where appropriate, one or more computing devices 800 can perform operations in real-time, near real-time, or in batch mode.

The processor 802 can be, for example, a central processing unit, a conventional microprocessor (e.g., Intel Pentium processor). The memory (e.g., main memory 806, non-private memory 810 and the private memory 814, machine-readable medium 826) can be local, remote, or distributed. Although shown as single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing device 800. One skill in the relevant art will recognize that the machine-readable medium 826 can include any type of medium that is accessible by the processor. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "software" or "computer programs"). The software (e.g., of software 812-1 and 812-2) typically includes one or more instructions (e.g., instructions 804, 808, 828), which set at various times in various memory and storage devices in computing device(s). When read and executed by the processor 802, the instruction(s) cause the computing device 800 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices (e.g., non-private memory 810 and the private memory 814), removable flash memory, hard disk drives, optical disks, and transmission-type media such as digital and analog communication links.

Software is typically stored in the non-volatile memory and/or the drive unit 824. When software is moved to the memory for execution, the processor 802 will typically make use of hardware registers to store values associated with the software and local cache that ideally serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 816 enables the computing device 800 to exchange data over a network 834 with an entity that is external to the computing device 800 through any communication protocol supported by the computing device 800 and the external entity. Examples of the network interface device 812 includes a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 812 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, an application, and the circumstances under which the permission rights stand.

Examples of the I/O devices 820 include a keyboard, a mouse or other pointing device, disk drives, printers, a scanner, and other input and/or output devices, including a display device. Examples of the display device 818 can include a cathode ray tube (CRT), liquid crystal display (LCD), or any display device.

In operation, the computer device 800 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention. Related concepts are described in U.S. patent application Ser. No. 17/466,429, titled "Mobile Device with Secure Private Memory," filed Sep. 3, 2021, which is incorporated by reference in its entirety for all purposes.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

What is claimed is:

1. A mobile device comprising:
  a non-private memory configured to store multiple software programs,
    wherein the multiple software programs include an application and a driver program, and
    wherein the driver program controls operations of a radio access technology (RAT) device, a positioning, navigation, or timing (PNT) device, an input/output (I/O) device, or a communications port of the mobile device;
  a private memory configured to store copies of the multiple software programs and additionally store a trusted software program;
    wherein the trusted software program is only stored in the private memory; and
  a processor configured to:
    boot the mobile device in a non-private mode that forbids access to the copies of the multiple software programs or the trusted software program,
    boot the mobile device in a private mode that allows access to the copies of the multiple software programs or the trusted software program, and
    enable switching of the mobile device from the non-private mode to the private mode in response to completion of a multifactor authentication (MFA) procedure.

2. The mobile device of claim 1, wherein the processor is configured to:
  execute the trusted software program stored on the private memory only when the mobile device is in the private mode.

3. The mobile device of claim 1, wherein the processor is configured to:
  selectively switch the mobile device between the non-private mode and the private mode in response to a reboot of the mobile device.

4. The mobile device of claim 1, wherein the MFA procedure verifies factors including a biometric factor or a near field communication (NFC) factor.

5. The mobile device of claim 1 further comprising:
  a communications channel configured to copy data between the private memory and the non-private memory,
    wherein the communications channel is disabled when the mobile device is in the non-private mode, and
    wherein the communications channel is enabled when the mobile device is in the private mode.

6. The mobile device of claim 1:
  wherein the non-private memory is configured to store the multiple software programs in accordance with a first encryption protocol, and
  wherein the private memory is configured to store the copies of the multiple software programs or trusted software program in accordance with a second encryption protocol different from the first encryption protocol.

7. The mobile device of claim 1:
  wherein the copies of the multiple software programs or the trusted software program stored in the private memory are encrypted when the mobile device is in a non-private mode, and
  wherein the copies of the multiple software programs or the trusted software program stored in the private memory are decrypted when the mobile device is in a private mode.

8. The mobile device of claim 1, wherein the non-private memory and the private memory are different partitions of a common memory device.

9. The mobile device of claim 1, wherein the non-private memory and the private memory are part of separate and distinct memory devices.

10. The mobile device of claim 1, wherein the processor is configured to:
  copy any of the multiple software programs from the private memory to the non-private memory only when the mobile device is in the private mode.

11. A mobile device comprising:
  a non-private memory configured to store multiple software programs,
    wherein the multiple software programs include an application and a driver program, and
    wherein the driver program controls operations of a radio access technology (RAT) device, a positioning, navigation, or timing (PNT) device, an input/output (I/O) device, or a communications port of the mobile device;
  a private memory configured to store copies of the multiple software programs and additionally store a trusted software program;
    wherein the trusted software program is only stored in the private memory; and
  a processor configured to:
    boot the mobile device in a non-private mode that forbids access to the copies of the multiple software programs or the trusted software program,
    boot the mobile device in a private mode that allows access to the copies of the multiple software programs or the trusted software program,
    remove a selected software program from the non-private memory, execute a restart procedure in response to user input,
wherein the restart procedure includes options to restart the mobile device (i) without the selected software program in the non-private memory and (ii) restore the selected software program in the non-private memory, receive an indication to restart the mobile device and restore the selected software program in the non-private memory, and restart the mobile device by restoring the selected software program in the non-private memory from a copy of the selected software program in the private memory.

12. The mobile device of claim 11, wherein the selected software program is a driver program for a cellular radio, a Wi-Fi radio, a GPS module, a Bluetooth radio, a camera device, a microphone device, or a USB port of the mobile device.

13. A mobile device comprising:

a non-private memory configured to store multiple software programs,
wherein the multiple software programs include an application and a driver program, and
wherein the driver program controls operations of a radio access technology (RAT) device, a positioning, navigation, or timing (PNT) device, an input/output (I/O) device, or a communications port of the mobile device;

a private memory configured to store copies of the multiple software programs and additionally store a trusted software program;
wherein the trusted software program is only stored in the private memory;

a processor configured to:
boot the mobile device in a non-private mode that forbids access to the copies of the multiple software programs or the trusted software program,
boot the mobile device in a private mode that allows access to the copies of the multiple software programs or the trusted software program; and one or more power sources configured to power the private memory and the non-private memory,
wherein both the private memory and the non-private memory are configured to draw power from the one or more power sources when the mobile device is in the private mode, and
wherein only the non-private memory is configured to draw power from the one or more power sources when the mobile device is in the non-private mode.

14. A mobile device comprising:

a non-private memory configured to store multiple software programs,
wherein the multiple software programs include an application and a driver program, and
wherein the driver program controls operations of a radio access technology (RAT) device, a positioning, navigation, or timing (PNT) device, an input/output (I/O) device, or a communications port of the mobile device;

a private memory configured to store copies of the multiple software programs and additionally store a trusted software program;
wherein the trusted software program is only stored in the private memory;

a processor configured to:
boot the mobile device in a non-private mode that forbids access to the copies of the multiple software programs or the trusted software program,
boot the mobile device in a private mode that allows access to the copies of the multiple software programs or the trusted software program, and
copy any of the multiple software programs from the private memory to the non-private memory only when the mobile device is in the private mode,
wherein a software program copied from the private memory replaces an existing software program stored on the non-private memory.

15. A mobile device comprising:

a non-private memory configured to store multiple software programs,
wherein the multiple software programs include an application and a driver program, and
wherein the driver program controls operations of a radio access technology (RAT) device, a positioning, navigation, or timing (PNT) device, an input/output (I/O) device, or a communications port of the mobile device:

a private memory configured to store copies of the multiple software programs and additionally store a trusted software program;
wherein the trusted software program is only stored in the private memory;

a display device; and a processor configured to:
boot the mobile device in a non-private mode that forbids access to the copies of the multiple software programs or the trusted software program,
boot the mobile device in a private mode that allows access to the copies of the multiple software programs or the trusted software program, and
while in the non-private mode, in response to a reboot sequence initiated at the mobile device, present a user interface on the display device,
wherein the user interface includes:
a first graphical control configured to, when actuated, change a power state of the mobile device,
a second graphical control configured to, when actuated, boot the mobile device in the non-private mode, and
a third graphical control configured to, when actuated, boot the mobile device in the private mode.

* * * * *